3,244,723
CERTAIN 4-AMINOTHIAZOLE COMPOUNDS AND THEIR PREPARATION
Francis Johnson, Newton Lower Falls, and Wilmonte A. Nasutavicus, Framingham, Mass., assignors to The Dow Chemical Company, Midland, Mich., a corporation of Delaware
No Drawing. Filed May 22, 1962, Ser. No. 199,214
25 Claims. (Cl. 260—306.8)

This invention relates to novel substituted 4-aminothiazoles; to the processes used in the preparation of these 4-aminothiazoles; and to an improved process for preparing α-cyanoalkyl thiocyanates.

It is an object of this invention to provide novel substituted 4-aminothiazoles. It is another object of this invention to provide novel processes for preparing substituted 4-aminothiazoles. The invention also contemplates providing a novel process for preparing α-cyanoalkylthiocyanates. Other objects and advantages of the invention will in part be obvious and in part appear hereinafter.

We discovered that when α-cyanoalkyl thiocyanates are treated with anhydrous hydrogen bromide, they are cyclized to form hydrogen bromide salts of 2-bromo-4-aminothiazoles, as illustrated in Equation I. The reaction product obtained from the reaction of Equation I may be acylated to obtain novel substituted 4-aminothiazoles containing one or two acyl groups substituted on the amino-nitrogen atom, as illustrated in Equation II. The mono- or diacylated 4-aminothiazole products of the process of Equation II, are dehalogenated as shown in Equation III to produce the novel mono- and/or diacylated 4-aminothiazoles illustrated as the products of Equation I:

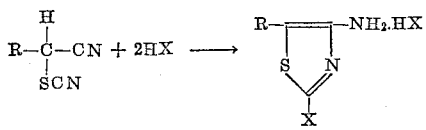

Equation II:

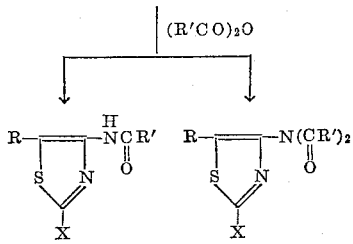

Equation III:

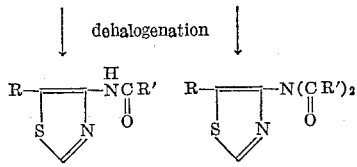

In the equations, R is hydrogen or an aliphatic, cycloaliphatic, or aryl group, and is preferably hydrogen, a lower alkyl group, a monocyclic cycloalkyl, or a monocyclic aryl group. The anhydride acylating reactant, (R′CO)₂O, is selected from aliphatic and aromatic acid anhydrides. The organic acid halides, e.g. acetylchloride, chloroacetyl chloride, benzoylchloride, etc., are the equivalent of the acid anhydrides and may be used in place of the anhydride as the acylating reactant. R′ is preferably a lower alkyl, a monocyclic cycloalkyl, or a monocyclic aryl group. The organic portions of the reactant α-alkylcyanothiocyanates and the reactant acid anhydrides, designated respectively R and R′, may contain substituting groups or radicals which do not react with reactants or other material present in the reaction mixture. Illustrative of such substituents are the Cl⁻, F⁻, NO₂⁻ and SO₃⁻ group. In the equations X is bromine.

The cyclization reaction occurs very rapidly (almost instantaneously). Although time and pressure are not critical factors, we prefer to allow the reactants from one-half to one hour in the reaction mixture before working up the product. Ambient temperatures are preferred. The temperature range from about 0° to about 50° C. may be employed. At higher temperatures the reaction product tends to become polymeric. As is apparent from Equation I, the ratio of the anhydrous hydrogen halide to the thiocyanate reactant should be at least 2:1. We prefer to use an excess over this ratio, to insure complete and rapid reaction. The reaction solvent should be inert to the reactants and reaction products; it should be non-polar. Illustrative of such solvents are glacial acetic acid, anhydrous ethyl and/or butyl ethers, ethylene dichloride, chloroform, carbon tetrachloride, nitromethane, benzene, etc. The preferred solvents are benzene, diethyl ether, methylene chloride and glacial acetic acid. The preferred combination of reactant and solvent is a mixture of about 30% of hydrogen bromide in glacial acetic acid. The following compounds are illustrative of the α-cyanoalkyl thiocyanate reactants:

p-Hydroxy, α-cyanobenzyl thiocyanate,
p-Nitro, α-cyanobenzyl thiocyanate,
m-Chloro, α-cyanobenzyl thiocyanate,
α-Cyanobenzyl thiocyanate,
1-cyano-(1-cyclopentyl)methyl thiocyanate,
p-Carbethoxy, α-cyanobenzyl thiocyanate,
1-cyano-1(2-bromoethyl)methyl thiocyanate,
1-cyano(1-ethyl)methyl thiocyanate,
1-cyano(1-styryl)methyl thiocyanate,
p-Acetamino, α-cyanobenzyl thiocyanate.

The acylation reaction is carried out at temperatures of between about 0° and 100° C. and preferably at ambient temperatures. The reaction takes place in a non-aqueous, non-polar solvent of the same type used in the cyclization reaction. Preferable solvents include benzene, methylene, chloride, diethyl ethers, and tetrahydrofuran. By varying the reaction conditions and the relative amount of the acylation reagent, it is possible to produce mono- or diacylated products. The presence of a base in the reaction mixture favors the production of the monoacylated product. We prefer to prepare the monoalkylated product by including a tertiary base, e.g., pyridine or triethylamine, in the reaction mixture. When the 4-aminothiazole hydrohalide is treated with the acylating agent, and no base is present, at 0–100° (heating may be necessary) for one-half hour, the diacylated product is obtained. Illustrative of the useful acylation reactants herein are: salicylic anhydride, propionic anhydride, benzoic anhydride, chloroacetic anhydride, acetyl chloride, benzoyl chloride, p-nitrobenzoyl chloride, p-acetaminobenzoyl chloride, pivaloyl chloride and cyclohexane carbonyl chloride. Preferred acylation reactants are acetic anhydride, acetyl chloride, and benzoyl chloride.

The 4-aminothiazoles are prepared from the 2-halo-4-aminothiazoles by dehalogenation of the 2-halo substituent. This dehalogenation is carried out by treating the 2-halo-4-aminothiazole in an inert solvent with hydrogen in the presence of a hydrogenation catalyst and as platinum, palladium or nickel. The reaction mixture should also contain a base, such as pyridine or potassium carbonate, to remove the halogen acid. We prefer to dehalogenate by preparing a solution of the 2-halo-4-aminothiazole in ethanol containing potassium hydroxide (1 equivalent); shake the hydrogen and a 5% palladium on charcoal catalyst.

We also discovered that α-cyanoalkyl thiocyanates may be advantageously prepared by heating an α-halonitrile or α-tosyloxynitrile with a thiocyanate at room temperature in an amide solvent such as dimethylformamide, N,N-dimethyl acetamide, N-formylmorpholine and N-formylanaline. The use of one equivalent of sodium thiocyanate in dimethylformamide at room temperature is preferred. The reaction is over in one-half hour and the yields are very high.

For the purpose of further explaining the invention to those skilled in the art, the following illustrative examples are given:

Example 1

α-Cyanomethylthiocyanate (5 g.) was dissolved in anhydrous ether (250 ml.) and this solution treated out of contact with moisture with anhydrous hydrogen bromide for 1 hr. A highly crystalline white precipitate which separated was collected by filtration. This precipitate, the hydrogen bromide salt of 2-bromo-4-aminothiazole, was washed once with dry ether and then added to acetic anhydride (35 ml.). The mixture was warmed gently on the steam bath until complete solution of the solid had taken place. After cooling, the pink liquid was poured into a considerable excess of 10% sodium acetate solution and stirred vigorously for 1 hr. The solution was extracted with methylene chloride and the organic extract washed twice with water, stirred with decolorizing charcoal for a short period of time and then dried over anhydrous sodium sulfate. Removal of the organic solvent gave a crystalline material. Recrystallization of this substance from acetone and light petroleum (1.110–120) gave two crops of 2-bromo-4-acetaminothiazole totalling 9.7 grams and melting at 163–164°. Further crystallization of this material from the same solvent mixture did not improve the melting point.

Example 2

Palladium on charcoal catalyst (10% palladium) was added to a solution of sodium acetate (0.084 g.) and 2-bromo-4-acetaminothiazole (0.221 g.) in ethanol (75 ml.). The mixture was then stirred with hydrogen at room temperature and pressure overnight. Gas absorption ceased after 1 equiv. of hydrogen had been taken up. The catalyst was removed by filtration and the filtrate evaporated under reduced pressure to yield a white solid. This was extracted with methylene chloride and the insoluble material removed by filtration. Evaporation of the methylene chloride led to a white crystalline solid, M.P. 181°. Further crystallization of this 4-acetaminothiazole from carbon tetrachloride raised the melting point to 184–186°. (Found: C, 42.1; H, 4.2; N; 19.4; S, 22.5. Req'd for $C_5H_6N_2OS$: C, 42.24; H, 4.25; N, 19.07; S, 22.6%.) A mixed melting point of this product with 2-acetaminothiazole showed a large depression. In addition, the infrared spectra of the 2- and 4-acetaminothiazoles showed marked differences.

Example 3

6 g. of 30–32% hydrogen bromide in glacial acetic acid (0.028 m.) added to 2 g. of 1-cyanobutyl thiocyanate (0.014 m.) dissolved in 5 ml. of glacial acetic acid. A white precipitate began to appear after 20 minutes. The reaction mixture was stirred for 2 hours at room temperature. At the end of this time a three-fold excess of acetic anhydride was added resulting in solution of the precipitate. After one hour the reaction mixture was poured into 5% sodium acetate solution with crystallization occurring immediately. Yield to crude 2-bromo-4-acetamino-5-propylthiazole($C_8H_{11}BrN_2OS$) 1.6 g. or 43%. The melting point after recrystallization from ethyl acetate was 104° C. Subsequent recrystallization from methylene chloride-petroleum ether (30–60° C.) raised the melting point to 107–109° C.

Example 4

Following the procedure of Example 3, benzoic anhydride is used in place of the acetic anhydride and diethyl ether in place of the glacial acetic acid to obtain 2-bromo-4-benzoylamino-5-propylthiazole. Similar results are obtained using benzoyl chloride in place of the anhydride.

Example 5

Following the procedure of Example 2, the product of Example 4 is dehalogenated to obtain 4-benzoylamino-5-propylthiazole.

Example 6

To 2.4 g. of 2,4-dichloro-α-cyano-benzylthiocyanate (0.01 m.) suspended in 8 ml. of glacial acetic acid were added dropwise with stirring 10 g. of 30–32% hydrogen bromide in glacial acetic acid. Solution was completed in 15 minutes. After a total time of one-half hour 20 ml. of acetic anhydride were added to the reaction mixture and it was stirred for one and one-half hours longer. At the end of this time it was poured into 5% sodium acetate solution. The resultant product was removed by filtration, yield crude 3.4 g. or 94%. The melting point of the crude 2-bromo-4-acetamino-5(2,4-dichloro)phenylthiazole ($C_{11}H_7Cl_2BrN_2OS$) was 130–132° C. Several recrystallizations from ethyl acetate petroleum ether (30–60° C.) raised the melting point to 134–136° C.

Example 7

Following the procedure of Example 2, the product of Example 6 is dehalogenated to obtain 4-acetamino-5(2,4-dichloro)phenylthiazole.

Example 8

Following the procedure of Example 6, butanoic anhydride is used in place of the acetic anhydride and methylene chloride in place of the acetic acid, to obtain 2-bromo-4-butyrylamino-5(2,4-dichloro)phenylthiazole.

Example 9

10 g. of 30–32% hydrogen bromide in glacial acetic acid (excess) were added to 2 g. of o-methoxy, α-cyanobenzyl thiocyanate (0.01 m.) suspended in 10 ml. of glacial acetic acid. The thiocyanate dissolved rapidly when the hydrogen bromide was added. After the reaction mixture stood one hour at room temperature excess acetic anhydride-pyridine (3:1 respectively) was added accompanied with a slight darkening of the reddish-brown solution. At the end of 45 min. the reaction mixture was poured into 15% sodium acetate solution with the product coming out of solution upon stirring. The product was removed by filtration and left to dry at room temperature for 48 hours. The yield of the dry crude 2-bromo-4-acetamino-5(2-methoxy)phenylthiazole $$(C_{12}H_{11}BrN_2O_2S)$$

was 2.7 g. or 82%; melting point 137–140°.

Example 10

For one and one-half hours anhydrous hydrogen bromide was bubbled through 5 g. of α-cyano-benzylthiocyanate (0.029 m.) dissolved in 75 ml. of anhydrous ethyl ether. The reaction was kept at 0° C. and under nitrogen. The ether was removed by filtration under nitrogen and the resultant solid was washed two times with 25 ml. of anhydrous ether. To the solid was added 11.7 g. of acetic anhydride in 4.5 g. of pyridine and the reaction was left overnight at room temperature under nitrogen. At the end of this time it was poured with stirring into 20% sodium acetate. The product was filtered off and washed with water. Upon crystallization from ethyl acetate, the yield of 2-bromo-4-acetamino-5-phenylthiazole ($C_{11}H_9BrN_2OS$) was 6.3 g.; melting point 160–163° C. Similar results are obtained using acetyl chloride in place of the acetic anhydride.

Example 11

2 g. of o-chloro, α-cyano-benzyl thiocyanate (0.0096 m.) were added as a slurry in glacial acetic acid to 6 g. (excess) of hydrogen bromide in glacial acetic acid. The partially dissolved starting material was completely dissolved after 5 minutes. After leaving the reaction mixture overnight at room temperature, about 30 ml. of acetic anhydride (excess) were added and the mixture allowed to remain at room temperature for three more hours. At the end of this time it was poured into 10% sodium acetate solution and stirred for several hours. The thiazole was filtered and dried; yield of crude 2-bromo-4-acetamino-5-(2-chloro)phenylthiazole.

($C_{11}H_8BrClN_2OS$)

1.7 g. or 55%; melting point 117–121° C. Upon recrystallization from ethyl acetate the melting point was raised to 120–121° C.

Example 12

Excess 30–32% hydrogen bromide in glacial acetic acid was added to 1 g. of p-chloro, α-cyanobenzyl thiocyanate. After allowing the reaction to stand for 4 hours at room temperature, 10 g. of acetic anhydride was added and the reaction stood for another 3 hours. Then the mixture was poured into 5% sodium acetate solution and stirred for ½ hour. The product 2-bromo-4-diacetamino-5(4-chloro)phenylthiazole ($C_{13}H_{10}BrClN_2O_2S$) was isolated by filtration, dried in air and recrystallized from ethyl acetate. Yield was 1.2 g. or 76%. The melting point was 202–4° C. This product is debrominated following the general procedure of Example 2, to obtain 4-diacetamino-5(4-chloro)phenylthiazole.

Example 13

Anhydrous hydrogen bromide was bubbled through a benzene solution (30 cc.) of 1 g. of α-cyanobenzylthiocyanate for 45 minutes at room temperature. Then the reaction mixture was allowed to stand at room temperature for another hour although a white precipitate had appeared within the first five minutes. At the end of this time, the organic solvent was removed by filtration and the residue dried with dry nitrogen. The reaction product, the hydrogen bromide salt of 2-bromo-4-amino-5-phenylthiazole, was then transferred into excess acetic anhydride and heated for one-half hour on the steam bath. Upon cooling, the reaction was poured into 10% sodium solution and stirred for one hour. Granular light tan crystals of 2-bromo-4-diacetamino-5-phenylthiazole ($C_{13}H_{11}BrN_2O_2S$)

were filtered off and dried in air. The yield was 1.6 g. or 94%, M.P. 146–150° C. The analytical sample was prepared by recrystallization from ethyl acetate. This product is dehalogenated, following the general procedure of Example 2, to obtain 4-diacetamino-5-phenylthiazole. Similar results are obtained using acetylchloride in place of acetic anhydride.

Example 14

To 3.6 grams (g.) of o-methoxy, α-cyano-benzyl chloride (0.02 m.) dissolved in 5 ml. of anhydrous dimethylformamide were added 1.6 g. of sodium thiocyanate dissolved in 15 milliliters (ml.) of anhydrous dimethyl formamide (D.M.F.). The reaction mixture was allowed to remain at room temperature for one and one-half hours. At the end of this time ice water was added and the product precipitated. Upon filtration the product was allowed to dry overnight, yield 3.8 g. or 93%. The melting point of the crude o-methoxy, α-cyano-benzylthiocyanate ($C_{10}H_8N_2OS$)

was 93–100° C. which was raised to 104–105° C. after treatment with charcoal and recrystallization from methylene chloride ether.

Example 15

To a solution of 6.4 g. of α-cyano, o-chloro-benzyl tosylate (0.02 m.) dissolved in a minimum amount of anhydrous dimethylformamide was added 1.72 g. of ammonium thiocyanate (0.02 m.) dissolved in a minimum amount of anhydrous dimethylformamide. The reaction mixture turned slightly yellow and the ammonium salt of p-toluenesulfonic acid began to appear after about ten minutes. After one-half hour the reaction mixture was filtered into ice water with immediate crystal formation. The product was removed by filtration and left to dry overnight. The weight of the crude o-chloro, α-cyano-benzylthiocyanate ($C_9H_5ClN_2S$) was 3.7 g. or 89%. The slightly blue crystals were recrystallized from methylene chloride-ether-petroleum ether (B.P. 30–60° C.). This resulted in a melting point of 86–88° C. of the analytical sample.

The novel substituted 4-aminothiazoles and the novel substituted 2-halo-4-aminothiazoles and derivatives of these compounds, have biological activity against fungus, brown root, bean aphid, two-spotted Spider Mite, plum curculio, northern fat-headed monnow and waterplant-coontail. The hydrogen halide salts of 2-halo-4-aminothiazoles are useful as intermediates in the preparation of the 2-halo-4-acylaminothiazoles and 4-acylaminothiazoles.

Although the invention has been illustrated by specific examples, it is to be understood that it includes all modifications and variations that come within the scope of the appended claims.

What is claimed is:

1. Substituted 2-halo-4-aminothiazoles having the formula

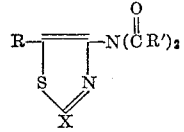

wherein R is selected from the group consisting of hydrogen; lower alkyl; lower alkyl substituted with chloro, bromo, fluoro, nitro, and sulfo; benzyl; cyclohexyl; cyclopentyl; styryl; phenyl; and phenyl substituted with chloro, bromo, fluoro, nitro, sulfo, methoxy, acetamino, hydroxy and carbethoxy; R' is selected from the group consisting of salicyl, propionyl, benzoyl, chloroacetyl, acetyl, p-nitrobenzoyl, p-acetaminobenzoyl, pivaloyl and cyclohexanecarbonyl; and X is bromo.

2. Substituted 4-aminothiazoles having the formula

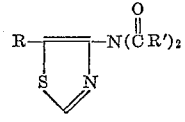

wherein R is selected from the group consisting of hydrogen; lower alkyl; lower alkyl substituted with chloro, bromo, fluoro, nitro, and sulfo; benzyl; cyclohexyl; cyclopentyl; styryl; phenyl; tnd phenyl substituted with chloro, bromo, fluoro, nitro, sulfo, methoxy, acetamino, hydroxy and carbethoxy; and R' is selected from the group consisting of salicyl, propionyl, benzoyl, chloroacetyl, acetyl, p-nitrobenzoyl, p-acetaminobenzoyl, pivaloyl and cyclohexanecarbonyl.

3. Substituted hydrogen halide salts of 2-halo-4-aminothiazoles having the formula

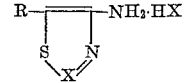

wherein R is selected from the group consisting of hydrogen; lower alkyl; lower alkyl substituted with chloro, bromo, fluoro, nitro, and sulfo; benzyl; cyclohexyl; cyclopentyl; styryl; phenyl; and phenyl substituted with chloro, bromo, fluoro, nitro, sulfo, methoxy, acetamino, hydroxy and carbethoxy; and X is bromo.

4. The salts of claim 3 wherein R is chlorophenyl.
5. The salts of claim 3 wherein R is a lower alkyl.
6. The salts of claim 3 wherein R is phenyl.
7. 2-bromo-4-acetamino-5-propylthiazole.
8. 2-bromo-4-acetamino-5(2,4-dichloro)phenylthiazole.
9. 2-bromo-4-acetamino-5(2-methoxy)phenylthiazole.
10. 2-bromo-4-acetamino-5-phenylthiazole.
11. 2-bromo-4-acetamino-5(2-chloro)phenylthiazole.
12. 2-bromo-4-diacetamino-5(4-chloro)phenylthiazole.
13. 2-bromo-4-diacetamino-5-phenylthiazole.
14. A process for preparing 4-aminothiazoles comprising reacting a thiocyanate selected from the group consisting of α-cyanomethyl thiocyanate and α-substituted-α-cyanomethyl-thiocyanates having the formula NCSH(H)(R)CN wherein R is selected from the group consisting of lower alkyl; lower alkyl substituted with chloro, bromo, fluoro, nitro, and sulfo; benzyl; cyclohexyl; cyclopentyl; styryl; phenyl; and phenyl substituted with chloro, bromo, fluoro, nitro, sulfo, methoxy, acetamino, hydroxy and carbethoxy, with two molar equivalents of an hydrogen bromide, in an inert solvent, at a temperature between 0° C. and 50° C.
15. A process for preparing salts of 2-bromo-4-aminothiazole and 5-substituted-2-bromo-4-aminothiazole comprising reacting a thiocyanate selected from the group consisting of α-cyanomethyl thiocyanate and the corresponding α-cyanos α-substituted-methyl thiocyanate, with two molar equivalents of anhydrous hydrogen bromide, in an inert solvent, at a temperature between 0° and 50° C., to form the corresponding hydrogen bromide of the 2-bromo-4-aminothiazole.
16. A process for preparing salts of 2-bromo-4-aminothiazole comprising reacting α-cyanomethyl thiocyanate with at least two molar equivalents of anhydrous hydrogen bromide in an inert solvent, at a temperature between 0° and 50° C., to form the corresponding hydrogen bromide salt of the 2-bromo-4-aminothiazole.
17. The process of claim 16 wherein said inert solvent is selected from the group consisting of benzene, diethyl ether, methylene chloride and glacial acetic acid.
18. The process of claim 16 wherein said inert solvent is glacial acetic acid.
19. The process of claim 17 wherein said hydrogen bromide is added to the reaction mixture as a 30% solution in glacial acetic acid.
20. The process of claim 17 wherein said reaction is carried out at ambient temperature.
21. A process for preparing salts of 5-substituted-2-bromo-4-aminothiazole comprising reacting the corresponding α-cyanos α-substituted-methyl thiocyanate, with at least two molar equivalents of anhydrous hydrogen bromide in an inert solvent, at a temperature between 0° and 50° C., to form the corresponding hydrogen bromide salt of the 2-bromo-4-aminothiazole.
22. The process of claim 21 wherein said inert solvent is selected from the group consisting of benzene, diethyl ether, methylene chloride and glacial acetic acid.
23. The process of claim 21 wherein said inert solvent is glacial acetic acid.
24. The process of claim 22 wherein said hydrogen bromide is added to the reaction mixture as a 30% solution in glacial acetic acid.
25. The process of claim 22 wherein said reaction is carried out at ambient temperature.

References Cited by the Examiner

UNITED STATES PATENTS

| | | | |
|---|---|---|---|
| 2,709,172 | 5/1955 | Dodson | 260—306.8 |
| 2,716,626 | 8/1955 | Martin | 260—454 |
| 2,863,874 | 12/1958 | Gregory | 260—306.8 |
| 2,892,834 | 6/1959 | De Stevens et al. | 260—240.5 |
| 2,965,537 | 12/1960 | Rosen | 260—454 |

FOREIGN PATENTS 164,789  12/1949  Austria.

OTHER REFERENCES

Burger: Medicinal Chemistry (New York, 1960), p. 1055.

Elderfield: Heterocyclic Compounds, vol. 5 (New York, 1957), pp. 539, 543 and 502.

Erlemeyer: Helv. Chim. Acta., vol. 29, pp. 1229–1239 (1945).

Johnson et al.: J. Org. Chem., vol. 28, pp. 1877–83 (1963).

Weissberger et al.: Technique of Organic Chemistry, vol. VII, Organic Solvents, pp. 244 and 447–450.

NICHOLAS S. RIZZO, *Primary Examiner.*